United States Patent
Walker et al.

(10) Patent No.: US 9,009,975 B2
(45) Date of Patent: Apr. 21, 2015

(54) FILTER UNIT

(75) Inventors: Brian Walker, Tyne and Wear (GB);
Alan Hodgson, Tyne and Wear (GB)

(73) Assignee: Walker Filtration Limited, Tyne and Wear (GB)

( * ) Notice: Subject to any disclaimer, the term of this patent is extended or adjusted under 35 U.S.C. 154(b) by 1209 days.

(21) Appl. No.: 12/601,356

(22) PCT Filed: May 23, 2008

(86) PCT No.: PCT/GB2008/001782
§ 371 (c)(1),
(2), (4) Date: May 3, 2010

(87) PCT Pub. No.: WO2008/142428
PCT Pub. Date: Nov. 27, 2008

(65) Prior Publication Data
US 2010/0205798 A1    Aug. 19, 2010

(30) Foreign Application Priority Data

May 23, 2007   (GB) .................................. 0709907.0
Oct. 4, 2007    (GB) .................................. 0719470.7

(51) Int. Cl.
*B23P 15/16*    (2006.01)
*B01D 46/00*    (2006.01)
(Continued)

(52) U.S. Cl.
CPC ........... *B01D 46/003* (2013.01); *Y10T 29/4998* (2015.01); *B01D 46/0001* (2013.01);
(Continued)

(58) Field of Classification Search
CPC  B29C 65/02; B29C 65/1432; B29C 65/1425;
B29C 65/1412; B29C 66/5344; B29C 66/542;
B29C 66/5432; B29C 66/54; B29C 66/0324;
B29C 70/766; B01D 46/2414; B01D 46/03;
B01D 46/00; B01D 46/01; B01D 46/4209;
B01D 46/50; B01D 2265/04; B01D 29/111;
B29K 2101/12; B29K 2305/00; B29K 2067/006; B29K 2995/0005; B29K 2077/00;
B29K 2105/16; B29K 2059/00
USPC ............ 29/896.6, 896.62, 902; 210/348, 498;
55/514, 323, 491, 490, 492, 498, 512,
55/510, 515
See application file for complete search history.

(56) References Cited

U.S. PATENT DOCUMENTS 2,962,121 A    11/1960    Wilber
(Continued)

FOREIGN PATENT DOCUMENTS

DE    102005 024238 A1    11/2006
(Continued)

OTHER PUBLICATIONS

MatWeb-Material Property Data-Overview of materials for Acetal Copolymer, Unreinforced.*
(Continued)

*Primary Examiner* — Peter DungBa Vo
*Assistant Examiner* — Azm Parvez
(74) *Attorney, Agent, or Firm* — Egbert Law Offices, PLLC

(57) ABSTRACT

A method of producing a filter unit, such as an air/oil separator, having a tubular filter element bonded at one end to an end cap, is proposed. The method includes the steps of: providing a tubular filter element and an end cap; melting a portion of the end cap; and embedding an end of the filter element into the melted portion of the end cap. The melted portion, on cooling, solidifies to bond the tubular filter element to the end cap. The end cap can be formed of thermoplastic containing an electrically conductive filler. The end cap can be formed of a thermoplastic having a melting point of at least 180 C. The method may further include, after the embedding step, a step of forcing melted thermoplastic from the melted portion radially against a side wall of the tubular filter element.

15 Claims, 2 Drawing Sheets

(51) Int. Cl.
*B01D 46/24* (2006.01)
*B01D 46/50* (2006.01)
*B29C 65/02* (2006.01)
*B29C 65/64* (2006.01)
*B29C 70/76* (2006.01)
*B01D 46/42* (2006.01)
*B29C 57/00* (2006.01)
*B29C 65/14* (2006.01)
*B29C 65/00* (2006.01)
*B29C 35/08* (2006.01)
*B29K 59/00* (2006.01)
*B29K 67/00* (2006.01)
*B29K 77/00* (2006.01)
*B29K 101/12* (2006.01)
*B29K 105/16* (2006.01)
*B29K 305/00* (2006.01)
*B29L 31/14* (2006.01)

(52) U.S. Cl.
CPC ............ *B01D46/2414* (2013.01); *B01D 46/50* (2013.01); *B01D 2265/04* (2013.01); *B29C 57/00* (2013.01); *B29C 65/02* (2013.01); *B29C 65/1412* (2013.01); *B29C 65/1425* (2013.01); *B29C 65/64* (2013.01); *B29C 66/0324* (2013.01); *B29C 66/54* (2013.01); *B29C 70/766* (2013.01); *B29C 2035/0822* (2013.01); *B29K 2059/00* (2013.01); *B29K 2067/006* (2013.01); *B29K 2077/00* (2013.01); *B29K 2101/12* (2013.01); *B29K 2105/16* (2013.01); *B29K 2305/00* (2013.01); *B29K 2995/0005* (2013.01); *B29L 2031/14* (2013.01); *B29C 65/1432* (2013.01); *B29C 66/5344* (2013.01); *B29C 66/542* (2013.01); *B01D 46/4209* (2013.01); *B29C 66/5432* (2013.01); *Y10S 29/902* (2013.01)

(56) References Cited

U.S. PATENT DOCUMENTS

| | | | | |
|---|---|---|---|---|
| 3,013,667 | A * | 12/1961 | Jackson et al. | 210/493.1 |
| 3,457,339 | A * | 7/1969 | Pall et al. | 264/162 |
| 3,772,857 | A * | 11/1973 | Jackson et al. | 55/418 |
| 4,172,709 | A | 10/1979 | Kippel et al. | |
| 4,352,854 | A * | 10/1982 | Siedenstrang et al. | 428/318.8 |
| 6,807,948 | B2 * | 10/2004 | Kanamaru et al. | 123/495 |
| 7,128,835 | B1 | 10/2006 | Hundley et al. | |
| 7,776,214 | B2 * | 8/2010 | Saito et al. | 210/231 |
| 7,964,012 | B2 * | 6/2011 | Choi et al. | 55/524 |
| 2007/0241036 | A1 * | 10/2007 | Amesoeder et al. | 210/90 |
| 2011/0115102 | A1 * | 5/2011 | Dema | 261/5 |
| 2011/0265312 | A1 * | 11/2011 | Choi et al. | 29/592.1 |

FOREIGN PATENT DOCUMENTS

| | | |
|---|---|---|
| DE | 102005024238 | 11/2006 |
| GB | 2300367 A | 6/1996 |
| WO | 0137969 A1 | 5/2001 |
| WO | 0187456 | 11/2001 |
| WO | WO 01/87456 A | 11/2001 |
| WO | WO 0187456 A2 * | 11/2001 |
| WO | WO0187456 A3 * | 4/2002 |
| WO | 2006056533 A1 | 6/2006 |

OTHER PUBLICATIONS

MatWeb-Material Property Data-Overview of materials for Acetal Copolymer,Unreinforced.*

* cited by examiner

FILTER UNIT

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a filter unit and a method of producing a filter unit. Preferably, but not necessarily, the filter unit is an oil/air separator.

2. Description of Related Art Including Information Disclosed Under 37 CFR 1.97 and 37 CFR 1.98.

A typical air/oil separator comprises a tubular filter element bonded at each end to a gas-impervious plastic or metal end cap. The filter element may be formed from the following coaxial components: (i) a tube of filter medium, (ii) a first foraminous support sleeve located on the downstream side of the filter medium tube, and optionally a second foraminous support sleeve located on the upstream side of the filter medium tube, and (iii) a highly porous drainage sleeve located on the downstream side of the first support cylinder. The integrity of, particularly, the bond between the filter medium and the end caps is important for the safe and effective use of the separator.

High efficiency separators that are used in oil lubricated compressors and vacuum pumps can operate at temperatures of well over 80 C and can reduce high inlet oil aerosol concentrations of typically 500 to 2000 mg/m3 to less than 5 mg/m3 outlet. Conventionally, such separators have metal or plastic support sleeves which prevent collapse or rupture of the separator due to high pressure drops. Further, they typically have metal or plastic end caps resin bonded to a filter element, which may utilise a deep bed filter medium containing borosilicate glass micro-fibres. A potting resin, such as a two part epoxy resin, is often used. However, a resin bond, if incorrectly established, can compromise the integrity of the bond between the filter medium and the end cap and result in a complete or partial failure (air bypass and excessive oil carryover) of the separator.

The use of resin systems can provide manufacturing problems. For example, it can be difficult to ensure that the correct volume of resin is dispensed within the end cap. Further, ensuring that the resin mix ratio and/or heat cure cycle is maintained to provide the optimum cure strength can be problematic. Also, two part resins which are dispensed through static mixers can be susceptible to trapped air pockets or bubbles. Additionally, a weak joint can be produced if surface cleanliness and surface texture are not strictly controlled.

A further problem associated with most potting resins is that they are not electrically conductive. Static electricity can build up as gas passes through the filter element, and if this electricity is not safely discharged, sparks can be generated, which in turn may lead to fire or explosion. The problem is particularly acute in the oil-saturated conditions in which separators operate.

Where conductive end caps and support sleeves are used with a non conductive resin, a conductive assembly can still be achieved by forcing the conductive components together and holding them under pressure until the resin sets to complete an electrical circuit. However, poor surface contact in the presence of an electrically insulating potting resin can prevent or inhibit static electricity on the filter element from discharging via the end caps.

One proposal, described e.g. in GB A 2300367, is to use a conductive resin in the construction of the filter to conduct static electricity away.

BRIEF SUMMARY OF THE INVENTION

In general terms, the present invention provides a method of producing a filter unit (such as an oil/air separator) having a tubular filter element bonded at one end to an end cap, the method comprising:
  providing a tubular filter element and an end cap (e.g. an end cap formed of a thermoplastic);
  melting a portion of the end cap; and
  embedding an end of the filter element into the melted portion of the end cap;
whereby said melted portion, on cooling, solidifies to bond the tubular filter element to the end cap.

In general terms, the present invention also provides a filter unit produced according to this method. For example, a filter unit may have a tubular filter element bonded at one end to an end cap, and the bond being achieved by embedment of the end of the filter element into a melted and re-solidified portion of the end cap.

More particularly, a first aspect of the invention provides a method of producing an oil/air separator having a tubular filter element bonded at one end to an end cap, the method comprising the steps of:
  providing a tubular filter element and a thermoplastic end cap (which may be electrically conductive by virtue of an electrically conductive filler contained in the thermoplastic);
  melting a portion of the end cap; and
  embedding an end of the filter element into the melted portion of the end cap; whereby said melted portion, on cooling, solidifies to bond the tubular filter element to the end cap.

A second aspect of the invention provides a method of producing a filter unit such as an oil/air separator having a tubular filter element bonded at one end to an end cap, the method comprising the steps of:
  providing a tubular filter element and an electrically conductive end cap, the end cap being formed of a thermoplastic containing an electrically conductive filler;
  melting a portion of the end cap; and
  embedding an end of the filter element into the melted portion of the end cap; whereby said melted portion, on cooling, solidifies to bond the tubular filter element to the end cap.

The method of either aspect allows an intimate and reliable bond between the filter element and the end cap to be formed without recourse to a resin. Such a bond can form a complete seal. It can be strong, air tight, durable and can also provide a pathway for the discharge of static electricity from the filter element to an electrically conductive end cap.

Eliminating the resin bond between the filter element and the end cap can also reduce production costs and increase manufacturing efficiency. For example, relative to a resin bonded end cap, precautions for ensuring that the end cap is grease and oil free prior to bonding can be relaxed as melt bonding is much less sensitive to surface contamination. The end cap can be manufactured using mould release agents that do not compromise melt bonding but would compromise resin bonding. Also melt bonding operations typically take seconds to complete, whereas resin bonding operations can take minutes. Exact and precise bonding volume can be ensured by appropriate mould design.

Preferably, in the method of either aspect, the or each thermoplastic has a melting point of at least 180 C, allowing the filter unit to be used in high temperature operating environments such as can be found in compressor and vacuum pump applications.

Indeed, a third aspect of the invention provides a method of producing a filter unit such as an oil/air separator having a tubular filter element bonded at one end to an end cap, the method comprising the steps of:

providing a tubular filter element and an end cap, the end cap being formed of a thermoplastic having a melting point of at least 180 C;

melting a portion of the end cap; and embedding an end of the filter element into the melted portion of the end cap; whereby said melted portion, on cooling, solidifies to bond the tubular filter element to the end cap.

Typically the method further comprises providing a second end cap formed of a thermoplastic having a melting point of at least 180 C, the melting and embedding steps being performed in respect of both end caps to bond each end of the filter element to one of the end caps.

The method of any one of the above aspects may include a step, after the embedding step, of forcing melted thermoplastic from said melted portion radially against a side wall of the tubular filter element. In this way, the melted thermoplastic can be forced through the holes of a foraminous side wall, formed by e.g. a coaxial drainage sleeve or support sleeve of the tubular filter element, such that when the thermoplastic solidifies it keys into the holes to effect a stronger more intimate bond. Generally, the outer side wall of the tubular filter element is more accessible than the inner side wall, so preferably, the melted thermoplastic is forced radially inwardly against the outer sidewall.

Indeed, a fourth aspect of the invention provides a method of producing a filter unit such as an oil/air separator having a tubular filter element bonded at one end to an end cap, the method comprising the steps of:

providing a tubular filter element and a thermoplastic end cap;

melting a portion of the end cap;

embedding an end of the filter element into the melted portion of the end cap; and forcing melted thermoplastic from said melted portion radially against a (preferably foraminous) side wall of the tubular filter element; whereby said melted portion, on cooling, solidifies to bond the tubular filter element to the end cap.

Preferably, the melted thermoplastic is forced radially inwardly against the outer sidewall.

The following optional features relate to any one of the above aspects.

To ensure there is sufficient melted thermoplastic available for the forcing operation and/or to ensure complete embedment of the filter element in the end cap, the melting step may involve melting a portion of the end cap corresponding in shape to the shape of the end of the tubular filter element (i.e. typically annular), but being of greater radial extent than the radial extent of the end of the tubular filter element. For example, the melted portion may be an annulus having an outer diameter larger then the outer diameter of the end of the tubular filter element, and preferably also an inner diameter which is smaller then the inner diameter of the end of the tubular filter element.

Typically, the method further comprises providing a second end cap formed of a thermoplastic, which optionally contains an electrically conductive filler, and optionally has a melting point of at least 180 C, wherein the melting and embedding steps and optionally the forcing step are performed in respect of both end caps to bond each end of the filter element to one of the end caps.

The filter element may comprise a tube of filter medium and a foraminous coaxial support sleeve supporting said tube at a downstream side thereof. The tube of filter medium may be electrically conductive. For example, the filter medium may comprise a mixture of non-electrically conductive fibres and electrically conductive fibres. Alternatively, the filter medium may comprise a body of non-electrically conductive fibres coated with an electrically conductive film. Preferably, the support sleeve is electrically conductive. The foraminous coaxial support sleeve is preferably electrically conductive and in intimate contact with the tube of filter medium. The tube may have inner and outer foraminous coaxial support sleeves. In this case, preferably at least the downstream sleeve is electrically conductive, although more preferably both sleeves are electrically conductive. The filter element may also have a foraminous drainage sleeve.

Typically, the portion of the end cap can be melted using infra-red heating. However other surface heating techniques could be employed such as a contacting hot plate, microwaves, or surface induction.

Preferably, the embedding step involves embedding the end of the tubular filter element into the melted portion of the end cap to a depth of at least 1 mm.

A further aspect of the invention provides a filter unit produced according to the method of any one of the previous aspects. The filter unit may be used as a compressed air filter, a vacuum pump filter or as an oil/air separator.

A first example of such a filter unit is an oil/air separator having a tubular filter element bonded at one end to a thermoplastic end cap, the bond between the tubular filter element and the end cap being a melt bond in which the end of the filter element is embedded in a melted, and subsequently resolidified, portion of the end cap.

A second example, is a filter unit having a tubular filter element bonded at least one end to an electrically conductive end cap, the end cap being formed of a thermoplastic containing an electrically conductive filler, and the bond between the tubular filter element and the end cap being a melt bond in which the end of the filter element is embedded in a melted, and subsequently resolidified, portion of the end cap.

A third example, is a filter unit having a tubular filter element bonded at one end to thermoplastic end cap, the end cap being formed of a thermoplastic having a melting point of at least 180 C, and the bond between the tubular filter element and the end cap being a melt bond in which the end of the filter element is embedded in a melted, and subsequently resolidified, portion of the end cap.

A fourth example, is a filter unit having a tubular filter element bonded at least one end to thermoplastic end cap, the bond between the tubular filter element and the end cap being a melt bond in which the end of the filter element is embedded in a melted portion of the end cap, and thermoplastic from said melted portion is forced radially against a side wall of the filter element, the melted portion subsequently resolidifying.

The first to fourth example filter units respectively correspond to the methods of the first to fourth aspects above. Thus optional features of those aspects provide corresponding optional features for the respective example filter units.

DETAILED DESCRIPTION OF THE INVENTION

Figure 1:
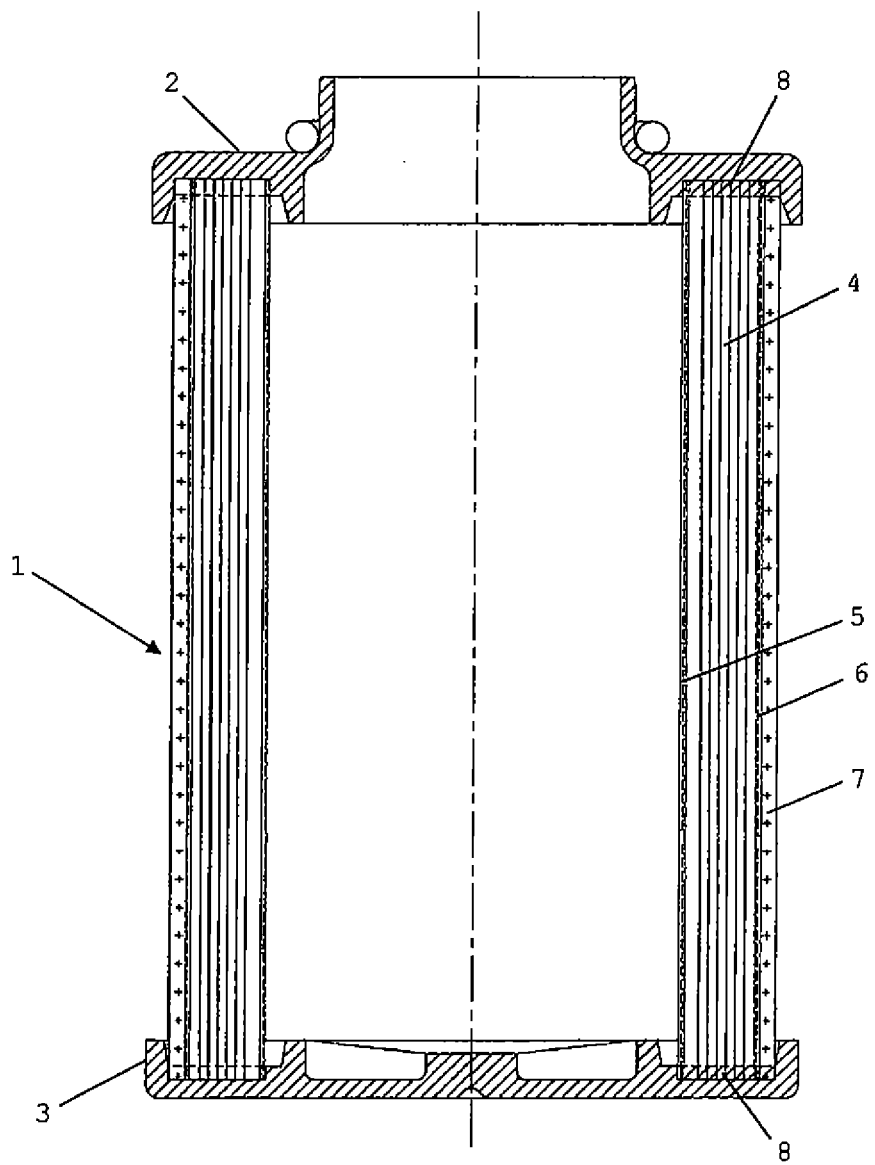
FIG. 1 is a cross-sectional view of the air/oil separator according to one embodiment of the present invention.

FIG. 1 shows a longitudinal cross-section through an air/oil separator according to an embodiment of the invention. The separator has a tubular filter element 1 bonded at both ends to respective gas-impervious, thermoplastic end caps 2, 3. End cap 2 has a central hole for in-coming air, which is then filtered by filter element 1. Filtered air exits from the external surface of filter element 1.

Filter element 1 has a tube 4 containing high efficiency, glass microfibres, such as borosilicate microfibres, which may be held together by binder and which separate out the oil carried by the incoming air. The downstream and upstream sides of tube 4 are supported by respective coaxial support sleeves 5, 6. The support sleeves are foraminous (typically providing an open area of greater than 40%) to allow the passage of air, and can be made, for example of metal (e.g. perforated or expanded zinc plated carbon steel) or from plastic. However, if they are of plastic, then at least downstream support sleeve 6 can contain a filler, such as carbon or metal fibres, to render the sleeve electrically conductive. At least downstream support sleeve 6 is in intimate contact with tube 4. One of the support sleeves can be metallic and the other can be plastic. A highly porous drainage sleeve 7, which may be electrically conductive, is located on the downstream side of support sleeve 6.

The filter element is bonded at each end to the end caps by melting a 360 degree, circular portion 8 of the respective end cap which corresponds to the end surface of the filter element, although preferably having slightly larger inner and outer diameters than the end surface of the filter element. The end of the filter element is rapidly plunged into the melted portion, and the filter element is held in position while the melted plastic cools and hardens. A slight oversize of circular portion 8 relative to the end surface of the filter element ensures that the filter element is fully embedded in the plastic. Preferably, infra-red radiation, which can be precisely controlled to heat and melt the desired portion of the end cap, is used. The melt bonding approach allows all the components of the filter element (i.e. tube 4, and sleeves 5, 6, 7) to be intimately and durably connected to the end caps via strong and dense direct bonds. A separator constructed in this way can have an oil carry-over efficiency in excess of 99%, and can avoid the problems associated with resin bonded end caps.

Using this approach, the filter element can be bonded to each end cap in less than about 20 seconds. This is at least ten times quicker than can be achieved with conventional resin bonding approaches.

Figure 2A:
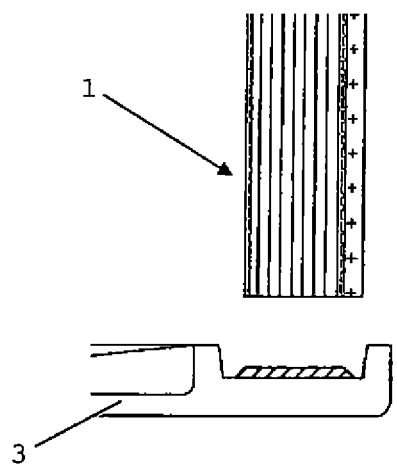
FIG. 2a is a schematic view of the assembly of the air/oil separator according to one embodiment of the present invention.

FIG. 2a shows in close-up the bottom right hand corner of the longitudinal cross-section of FIG. 1 just before the end of filter element 1 is plunged into melted portion 8 of the end cap 3, melted portion 8 being formed from a raised annulus of thermoplastic.

Figure 2B:
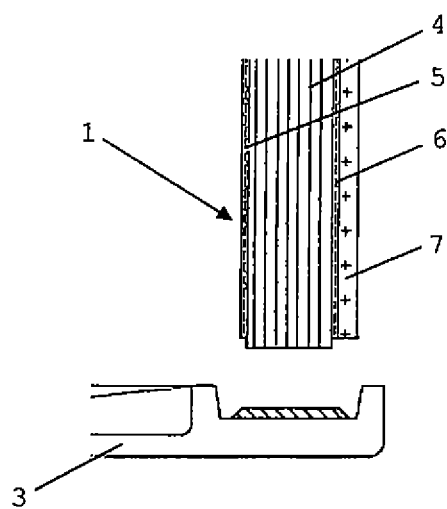
FIG. 2b is a schematic view of the assembly of the air/oil separator according to another embodiment of the present invention.

FIG. 2b is a view corresponding to FIG. 2a for an alternative embodiment of filter element 1 in which tube 4 extends axially a short distance beyond sleeves 5, 6, 7.

Optionally, before the melted plastic cools and hardens, excess melted plastic at the radially outer side wall of the filter element 1 is pressed through the holes in drainage sleeve 7 and support sleeve 6 to effect a stronger, more intimate, bond between the filter element and the end cap.

Preferably, the end caps are formed from a thermoplastic which is resistant and compatible with synthetic and mineral oils at high temperatures (up to 130 C). Suitable materials include PBT (polybutylene terephthalate), nylon, acetal or other thermoplastics which have melting points of at least 180 C, and thus are suitable for use in high temperature operating environments.

The separator can be adapted to reduce the risk of sparking produced by static electricity. For example, the thermoplastic of the end caps can contain a filler, such as carbon or metal fibres, which renders the end caps electrically conductive. At least about 5% by volume of conductive filler in the thermoplastic is generally required. For example, in some embodiments, the end caps may contain a metal fibre filler (e.g. stainless steel or aluminium fibres) in an amount from 5% to 20% (preferably from 5% to 10%) by volume. In other embodiments, the end caps may contain carbon filler in an amount from 20% to 40% (preferably from 25% to 35%) by volume.

Tube 4 containing the high efficiency, glass microfibres may be formed from a mixture of non-conducting fibres (e.g. the glass fibres) and conducting fibres (e.g. metal fibres). Alternatively, the glass microfibres may be coated with an electrically conductive film (e.g. produced during the manufacturing process of the filter media containing the fibres, or added as a post treatment of the media by submersion in or spraying on of suitable surface treatments). Either way, static electricity generated on the microfibres by the passage of air or gas can be transferred to the end caps, either directly through the ends of tube 4 or via a conductive support sleeve, the melt bonds between the end caps and tube 4 and sleeves 5, 6 providing a conductive joint.

In use, end cap 2 with the central hole will typically be in a sealed relationship with a compressor or vacuum pump casing, the sealing mechanism normally being a non-conductive gasket or "O" ring. However where a conductive cap is used an earth circuit can be achieved by using conductive gasket materials 0-rings or earth bond. Alternatively, an earth bond such as a metal foil conductor can be extended between end cap 2 and the compressor or vacuum pump casing. Alternatively or additionally, end cap 3 can be electrically earthed by other mechanical means to safely discharge the static electricity.

With safe discharge of static electricity, the air/oil separator can be used in hazardous explosive atmosphere environments.

The microfibres of tube 4 may be provided in the form of filter paper, the micro-fibres being held together in the paper e.g. by acrylic binder. Typically such paper is less than 1 mm thick and can be spiral wrapped into a tubular multi layer construction of between 5 and 20 layers to form tube 4. Furthermore, such papers can have chemical treatments, nano-fibre additions and polymer fibre additions, e.g. to enhance oil aerosol removal efficiency, reduce operating pressure loss, and/or improve the physical strength.

Alternatively, tube 4 can be formed by vacuum or pressure moulding the microfibres. In the vacuum process the microfibres are mixed in an (typically acidic) aqueous solution and then drawn on to a porous mandrel by means of a vacuum until the desired thickness is reached. In the pressure moulding process the same fibre solution is pumped under pressure through a porous annular mould until the mould is full. In both cases the resultant tube is oven dried, resin impregnated, and heat cured to form a rigid self-supporting filter tube.

Drainage sleeve 7 can be conductive or non-conductive. The sleeve can formed from e.g. reticulated foam, or polyester fibre felt. A felt sleeve can be woven, but non-wovenfelt is preferred. Such felts can have thicknesses in excess of 3 mm, and can have chemical treatments to provide oliophobic and hydrophobic qualities to enhance oil drainage and reduce oil carryover.

While the invention has been described in conjunction with the exemplary embodiment described above, many equivalent modifications and variations will be apparent to those skilled in the art when given this disclosure. For example, in the separator shown in FIG. 1, the downstream side of filter element 1 is its radially outer side. However, in other embodiments, which draw in-coming air through the external surface of the filter element, and discharge filtered air from the central hole of the filter element, the downstream side of the filter element is its radially inner side. Accordingly, the exemplary embodiment of the invention set forth above is considered to be illustrative and not limiting. Various changes to the described embodiment may be made without departing from the spirit and scope of the invention.

We claim:

1. A method of producing a filter unit, the method comprising:
   providing a tubular filter element and a thermoplastic end cap, said thermoplastic end cap having inner and outer annular raised side walls and a raised annular portion located between and spaced from the raised side walls;
   melting the raised annular portion of the end cap;
   embedding an end of the tubular filter element into the melted portion of the end cap;
   forcing melted thermoplastic from said melted portion radially against a side wall of the tubular filter element; and
   cooling the melted portion so as to solidify to bond the tubular filter element to the end cap.

2. The method of claim 1, said thermoplastic end cap being an electrically-conductive end cap formed of a thermoplastic material containing an electrically-conductive filler material.

3. The method of claim 1, further comprising:
   heating the thermoplastic material to a temperature of at least 180° C.

4. The method of claim 1, further comprising:
   providing another end cap having inner and outer annular raised side walls and a raised annular portion located between and spaced from the raised side walls of said another end cap;
   melting the raised annular portion of the another end cap;
   embedding another end of the tubular filter element into the melted portion of the another end cap;
   forcing melted thermoplastic from the melted portion of the another end cap radially against the side wall of the tubular filter element; and
   cooling the melted portion of the another end cap so as to solidify to bond the another end of the tubular filter element to the another end cap.

5. The method of claim 1, the step of providing the tubular filter element comprising:
   forming the tubular filter element of a tube of filter medium having a foraminous coaxial support sleeve supporting the tube at a downstream side thereof.

6. The method of claim 5, further comprising:
   forming the tube of filter medium of an electrically conductive material.

7. The method of claim 6, the filter medium being a mixture of non-electrically conductive fibers and electrically conductive fibers.

8. The method of claim 6, the filter medium being a body of non-electrically conductive fibers coated with an electrically conductive film.

9. The method of claim 5, the support sleeve being electrically conductive.

10. The method of claim 1, the step of melting comprising:
    melting the portion of the thermoplastic material of the end cap by infrared radiation.

11. The method of claim 1, the step of melting comprising:
    melting the portion of the thermoplastic material of the end cap by microwave energy.

12. The method of claim 1, the step of melting comprising:
    melting the portion of the thermoplastic material of the end cap by induction heating.

13. The method of claim 1, the step of melting comprising:
    melting the portion of the thermoplastic material of the end cap by direct contact surface heating.

14. The method of claim 1, the filter unit being a compressed air filter.

15. The method of claim 1, the filter unit being an air/oil separator.

* * * * *